United States Patent [19]

Hashimoto et al.

[11] Patent Number: 4,913,117
[45] Date of Patent: Apr. 3, 1990

[54] CONTROL APPARATUS OF AN INTERNAL COMBUSTION ENGINE

[75] Inventors: Toru Hashimoto; Akira Takahashi, both of Kyoto; Mamoru Sugiura, Kameoka, all of Japan

[73] Assignee: Mitsubishi Jidosha Kogyo Kabushiki Kaisha, Tokyo, Japan

[21] Appl. No.: 225,306

[22] Filed: Jul. 28, 1988

[30] Foreign Application Priority Data

Aug. 5, 1987 [JP] Japan ................................ 62-194313

[51] Int. Cl.$^4$ ........................ F02D 41/04; F02P 5/15
[52] U.S. Cl. ...................................... 123/425; 123/435
[58] Field of Search ............................. 123/425, 435; 364/431.08

[56] References Cited

U.S. PATENT DOCUMENTS

| 4,489,692 | 12/1984 | Haraguchi et al. | 123/425 |
| 4,517,944 | 5/1985 | Inoue et al. | 123/425 |
| 4,586,475 | 5/1986 | Takahashi et al. | 123/425 |
| 4,594,982 | 6/1986 | Takahashi et al. | 123/425 |
| 4,594,983 | 6/1986 | Takahashi et al. | 123/425 |
| 4,619,236 | 10/1986 | Okada et al. | 123/425 |
| 4,620,518 | 11/1986 | Nagai | 123/435 X |
| 4,635,604 | 1/1987 | Iwata et al. | 123/425 |
| 4,694,801 | 9/1987 | Nagai | 123/425 |

FOREIGN PATENT DOCUMENTS

| 0138495 | 4/1985 | European Pat. Off. |
| 2156905 | 10/1985 | United Kingdom |
| 2169957 | 7/1986 | United Kingdom |

*Primary Examiner*—Willis R. Wolfe
*Attorney, Agent, or Firm*—Frishauf, Holtz, Goodman & Woodward

[57] ABSTRACT

A control apparatus of an internal combustion engine which has an air-fuel ratio adjusting device for adjusting the air-fuel ratio of an air-fuel mixture, and an ignition device for igniting the air-fuel mixture. When a knock sensor detects a knocking state of the engine, it delivers a knock signal corresponding to the detected knocking state. In response to the knock signal delivered from the knock sensor, first correction data, which instantaneously prevents the knocking state by changing to a high degree, and second correction data, which corresponds to the properties of fuel used and prevents the knocking state by changing to a low degree, are calculated. The ignition timing is set in accordance with the calculated first and second correction data, whereby the operation of the ignition device is controlled. The air-fuel ratio is set in accordance with at least one of the first and second correction data, whereby the operation of the air-fuel ratio adjusting device is controlled.

21 Claims, 14 Drawing Sheets

FIG.7

| | $N_1$ | $N_2$ | $N_3$ | ...... | $N_{i-1}$ | $N$ |
|---|---|---|---|---|---|---|
| $(A/N)_1$ | $\Theta_{P11}$ | $\Theta_{P21}$ | $\Theta_{P31}$ | | | $\Theta_{Pi1}$ |
| $(A/N)_2$ | $\Theta_{P12}$ | $\Theta_{P22}$ | | | | |
| $\vdots$ | $\vdots$ | $\vdots$ | | | | |
| $(A/N)_{j-1}$ | | | | | | |
| $(A/N)_j$ | $\Theta_{P1j}$ | | | | | $\Theta_{Pij}$ |

|  | $N_1$ | $N_2$ | $N_3$ | ...... | $N_{i-1}$ | $N_i$ |
|---|---|---|---|---|---|---|
| $(A/N)_1$ | $K_{P11}$ | $K_{P21}$ | $K_{P31}$ |  | $K_{Pi-1,1}$ | $K_{Pi1}$ |
| $(A/N)_2$ | $K_{P12}$ | $K_{P22}$ |  |  |  |  |
| $(A/N)_3$ |  |  |  |  |  |  |
| ⋮ | ⋮ |  |  |  |  |  |
| $(A/N)_{j-1}$ | $K_{P1j-1}$ |  |  |  |  |  |
| $(A/N)_j$ | $K_{P1j}$ |  |  |  |  | $K_{Pij}$ |

CONTROL APPARATUS OF AN INTERNAL COMBUSTION ENGINE

BACKGROUND OF THE INVENTION

The present invention relates to a control apparatus of an internal combustion engine, and more particularly, to a control apparatus capable of satisfactory air-fuel ratio control for fuels of any types having different properties.

In some cases, the properties of fuels used in internal combustion engines may vary in different localities or nationalities and depending on the season. In those countries in which leaded gasoline is being replaced by lead-free gasoline, there is a demand for the use of various fuels with different octane numbers. In engines matched to the use of low-octane fuels, the ignition timing is adjusted so as to tend to delay. If a high-octane fuel is used in these engines, therefore, it cannot fulfill its intrinsic potential for the engine output. In engines matched to the use of high-octane fuels, on the other hand, the ignition timing is adjusted so as to tend to advance. If a low-octane fuel is used in these engines, therefore, the engines will possibly knock and be damaged.

In order to avoid these awkward situations, an arrangement for ignition timing control (knock control) for the fuel used has been conventionally employed wherein an octane-number selector switch is provided which is shiftable according to the octane number of the fuel used. By shifting this switch, a basic ignition timing map is selected corresponding to the octane number of the fuel used. Also, a knock sensor is attached to the engine, whereby a retard amount is determined in accordance with a knock amount. Thus, a basic ignition timing calculated on the basis of a value read from the basic ignition timing map in accordance with the retard amount is corrected, so as to be suited to the fuel used.

When a low-octane fuel is used, however, exhaust gas cannot be prevented from increasing its temperature so much that the components of an exhaust system are damaged, by only setting the ignition timing so as to tend to delay. To eliminate this disadvantage, the octane-number selector switch shiftable according to the octane number of the fuel used can be used also for the selection of a basic injection quantity map. In this case, the basic injection quantity map is selected corresponding to the octane number of the fuel used, so that a basic injection quantity is adjusted to values corresponding to the rich and lean sides for low- and high-octane fuels, respectively.

However, if the octane-number selector switch is manually operated to select the basic ignition timing map and the basic injection quantity map, it is liable to suffer wrong operation or miss being operated. For example, if the selector switch is shifted to the low-octane side, under a misapprehension that a low-octane fuel is being used, the ignition timing is gradually switched to the advance (lead) side by knock control. Finally, the ignition timing is advanced to a point of time just before knocking is detected by the knock sensor. In this case, the air-fuel ratio is set on the rich side for the supposed use of the low-octane fuel, so that the engine cannot be damaged. In contrast with this, if the octane-number selector switch is shifted to the high-octane side, under a misapprehension that a high-octane fuel is being used, the ignition timing is gradually switched to the delay side by knock control. Finally, the ignition timing is delayed to a point of time when knocking cannot be detected by the knock sensor. In this ccase, the air-fuel ratio is set on the lean side for the supposed use of the high-octane fuel, so that the exhaust gas may increase its temperature, thereby damagingn the components of the exhaust system. If high-speed, high-load operation is continued, in particular, the possibility of such damaging is high.

OBJECTS AND SUMMARY OF THE INVENTION

A primary object of the present invention is to provide a control apparatus of an internal combustion engine permitting use of various fuels with different octane numbers and other properties.

Anothe object of the present invention is to provide a control apparatus of an internal combustion engine, which is capable of ignition timing control and air-fuel ratio control best suited for the properties of the fuel used, thus preventing knocking of the engine and increase of the exhaust gas temperature.

According to the present invention, there is provided a control apparatus of an internal combustion engine which has air-fuel ratio control means for controlling the operation of an air-fuel ratio adjusting device for adjusting the air-fuel ratio of an air-fuel mixture to be supplied to the engine, and ignition timing control means for controlling the operation of an ignition device for igniting the air-fuel mixture supplied to the engine. In this control apparatus of the invention, knock detecting means, which is used to detect a knocking state of the engine, delivers a knock signal corresponding to the detected knocking state when it detects the knocking state. Correction data calculating means calculates a value of first correction data tending to change to a high degree, thereby preventing the knocking state, and a value of second correction data tending to change to a low degree, thereby preventing the knocking state, in response to the knock signal delivered from the knock detecting means. The ignition timing control means sets the ignition timing in accordance with the first and/or second correction data calculated by the correction data calculating means, and controls the operation of the ignition device on the basis of the set ignition timing. The air-fuel ratio control means sets air-fuel ratio in accordance with the first and/or second correction data calculated by the correction data calculating means, and controls the operation of the air-fuel ratio adjusting device on the basis of the set air-fuel ratio.

Preferably, the value of the first correction data is calculated so as to change in a first direction when the knock signal is delivered, and to change in a second direction opposite to the first direction when the knock signal is not delivered, while the value of the second correction data is calculated so as to change in a third direction when the value of the first correction data changes in the first direction to get beyond a preset value or range, and to change in a fourth direction opposite to the third direction when the value of the first correction data changes in the second direction to get beyond the preset value or range. Preferably, moreover, the changes of the second correction data in the third and fourth directions are different in degree, and more preferably, the second correction data is calculated to take a value such that the degree of the change of the second correction data in the third direction is higher than that in the fourth direction.

The ignition timing control means is adapted to set the ignition timing on the delay side when the value of the first correction data changes in the first direction, and to set the ignition timing on the advance side when the value of the first correction data changes in the second direction. Also, the ignition timing control means is adapted to set the ignition timing on the delay side when the value of the second correction data changes in the third direction, and to set the ignition timing on the advance side when the value of the second correction data changes in the fourth direction. Meanwhile, the air-fuel ratio control means is adapted to adjust the air-fuel ratio to a value on the fuel-rich side when the value of the first correction data changes in the first direction, and to adjust the air-fuel ratio to a value on the fuel-lean side when the value of the first correction data changes in the second direction. Also, the air-fuel ratio control means is adapted to adjust the air-fuel ratio to a value on the fuel-rich side when the value of the second correction data changes in the third direction, and to adjust the air-fuel ratio to a value on the fuel-lean side when the value of the second correction data changes in the fourth direction.

Preferably, moreover, the air-fuel ratio control means sets basic air-fuel ratio data in accordance with the load of the engine detected by load detecting means and the speed of the engine detected by speed detectring means, so that the air-fuel ratio is set by correcting the basic air-fuel ratio data in accordance with the first correction data. The first correction data is calculated to take a value between predetermined upper and lower limit values so that the basic air-fuel ratio data is corrected to take a value on the fuel-rich side in accordance with the deviation between the first correction data and a predetermined reference value between the upper and lower limit values when the value of the first correction data changes in the first direction to get beyond the references value, and that the correction of the basic air-fuel ratio data by means for the first correction data is stopped when the value of the first correction data changes in the second direction to get beyond the reference value.

Preferably, furthermore, the correction of the basic air-fuel ratio data by means of the first correction data id effected only when a predetermined high-speed, high-load operating state of the engine is detected by operating state detecting means.

Preferably, moreover, the air-fuel ratio control means stores first basic air-fuel ratio data adpated for a high-octane fuel and second basic air-fuel ratio data adapted for a low-octane fuel, calculates interior division point data of the stored first and second basic air-fuel ratio data in accordance with the second correction data, and sets the air-fuel ratio in accordance with the calculated interior division point data.

The correction data calculating means includes non-volatile memory means which retentively stores the second correction data even after the operation of the engine is stopped, so that the second correction data can be used when the engine is operated thereafter. Also, the correction data calculating means includes switch means which can be selectively shifted, by manual operation, between a first shift position to provide initial correction data adapted for a high-octane fuel and a second shift position to provide initial correction data adapted for a low-octane fuel, whereby the initial value of the second correction data is given depending on the shift position of the switch means.

The above and other objects, features, and advantages of the invention will be more apparent from the ensuing detailed description taken in connection with the accompanying drawings.

BRIEF DESCRIPTION OF THE DRAWINGS

FIG. 7 is a diagram showing a basic ignition timing map for premium-octane gasoline from which a basic ignition timing $\theta_P$ is read in accordance with an engine speed Ne and an intake-air quantity A/N;

DETAILED DESCRIPTION

Figure 1:
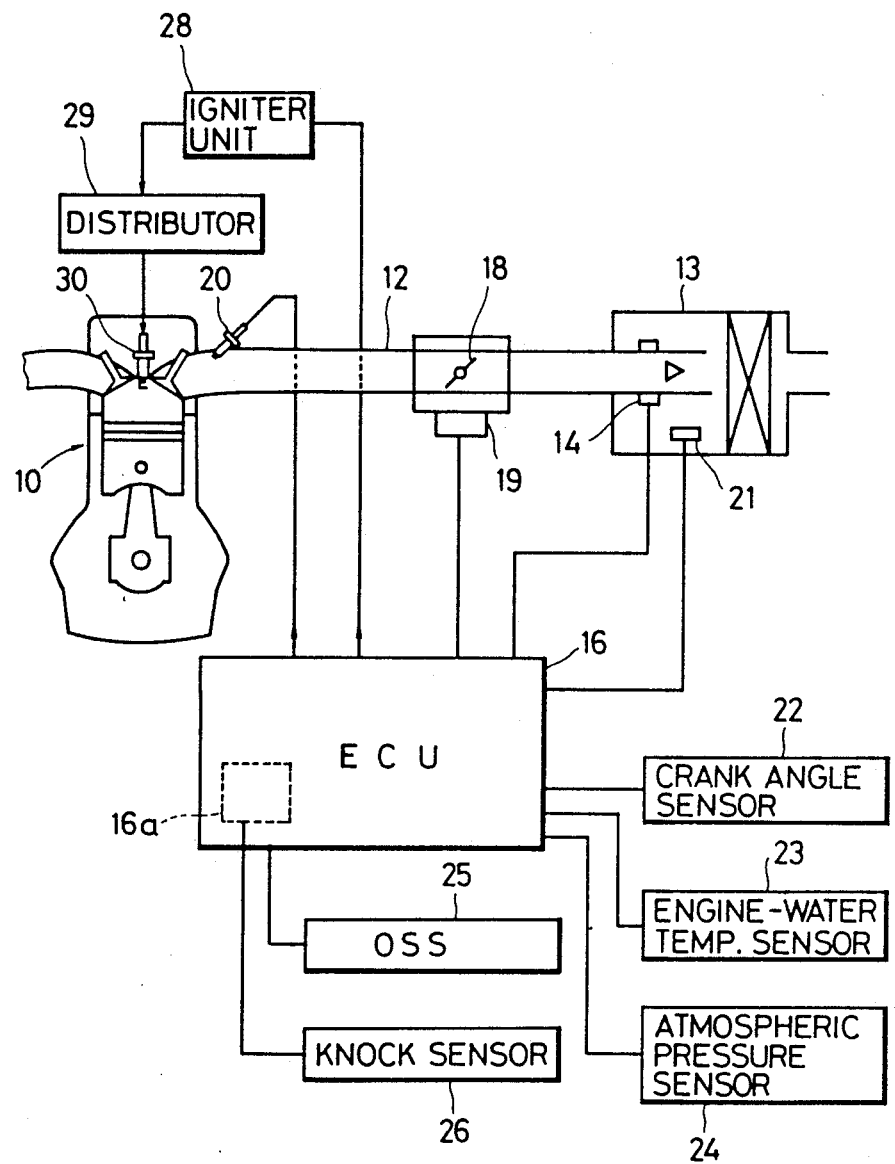
FIG. 1 is a block diagram showing an arrangement of a control apparatus of an internal combustion engine according to the present invention.
Figure 2:
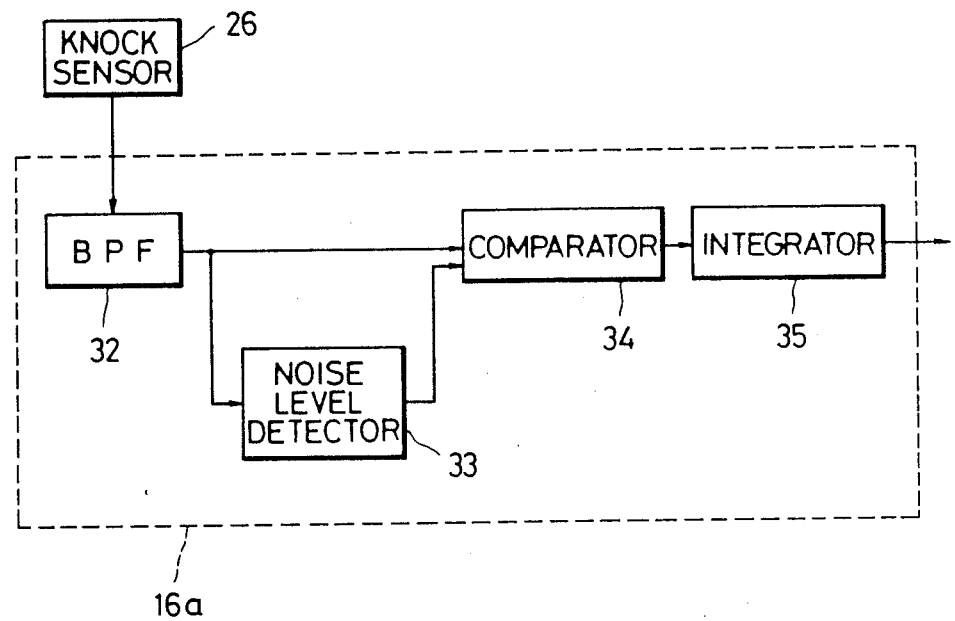
FIG. 2 is a block diagram showing an arrangement of a knock detecting circuit 16a contained in an electronic control unit 16 shown in FIG. 1.

Referring first to FIGS. 1 and 2, an arrangement of a control apparatus of an internal combustion engine according to the present invention will be described in detail. In FIG. 1, numeral 10 denotes a multi-cylinder internal combustion engine, e.g., a four-cylinder gasoline engine, and numeral 12 denotes a suction passage connected to the respective suction ports of engine cylinders. An air cleaner 13 and an air flow sensor 14 of a Kármán-vortex type are attached to an atmosphere-side open end portion of the suction passage 12. The air flow sensor 14, which is connected electrically to the input side of an electronic control unit (ECU) 16, supplies a Kárman-vortex generation period signal f to the control unit 16. A throttle valve 18 is disposed in the middle of the suction passage 12, and a fuel injection valve 20 is provided at that portion of the suction passage 12 near the suction port of each engine cylinder. Each fuel injection valve 20 is connected to output side of the electronic control unit 16, and is driven by means of a drive signal from the control unit 16.

Various engine operation parameter sensors are connected to the input side of the electronic control unit 16. These sensors include a throttle sensore 19, intake-air temperature sensor 21, crank angle position sensor 22, engine-water temperature sensor 23, atmospheric pressure sensor 24, octane-number selector switch (OSS) 25, knock sensor 26, etc., for example. The throttle sensor 19 is used to detect the valve opening $\theta t$ of the throttle valve 18. The intake-air temperature sensor 21, which is mounted in the air cleaner 13, is used to detect the intake-air temperature Ta. The position sensor 22 serves to detect a predetermined crank angle position (e.g., 75° before the top dead center of the suction stroke) of each engine cylinder. The engine-water temperature sensor 23 and the atmospheric pressure sensor 24 are used to detect the cooling-water temperature Tw of the engine 10 and the atmospheric pressure Pa, respectively. The OSS 25 is manually shiftable between two positions, e.g., a premium-octane (e.g., RON-95) position and a regular-octane (e.g., RON-91) position, depending on the octane number of fuel supplied to the engine 10. The knock sensor 26, which is attached to a cylinder block of the engine 10, is used to detect the knock level of the engine. Detection signals from these sensors are supplied to the electronic control unit 16.

An ignition plug 30 is attached to each cylinder of the engine 10. The plug 30 is connected to the input side of the electronic control unit 16 through a distributor 29 and an igniter unit 28, which includes an ignition coil to generate a high secondary voltage. The igniter unit 28 produces the high secondary voltage in response to an ignition signal from the electronic control unit 16. The high secondary voltage is supplied in regular succession to the respective ignition plugs 30 of the individual cylinders by means of the distributor 29.

The electronic control unit 16 comprises a central processing unit (CPU), ROM, RAM, nonvolatile RAM, I/O interface, A/D converter, knock detector circuit 16a, etc. Illustration of all these elements except the circuit 16a is omitted. The CPU calculates the ignition timing, injection quantity, etc., which will be mentioned later. The ROM stores various arithmetic programs, while the RAM temporarily stores data. The nonvolatile RAM retentively stores those data which continue to be necessary even after the operation of the engine 10 is stopped, and is backed up by a battery. The electronic control unit 16 calculates the ignition timing in the manner mentioned later, in accordance with engine operation parameter values detected by means of the various aforementioned sensors. Based on the calculated ignition timing, the control unit 16 delivers the ignition signal, calculates the injection quantity, and delivers a valve opening drive signal to the fuel injection valves 20.

The knock detector circuit 16a is composed of a band-pass filter (BPF) 32, noise level detector 33, comparator 34, and integrator 35. The knock sensor 26 is connected to the input of the BPF 32, the output of which is connected to one input terminal of the comparator 34 and also to the input of the noise level detector 33. The output of the noise level detector 33 is connected to the other input terminal of the comparator 34. The output of the comparator 34 is connected to the input of the integrator 35, the output of which is connected to the input of the aforesaid A/D converter (not shown).

The following is a description of the operation of the internal combustion engine constructed in this manner.

Figure 3:
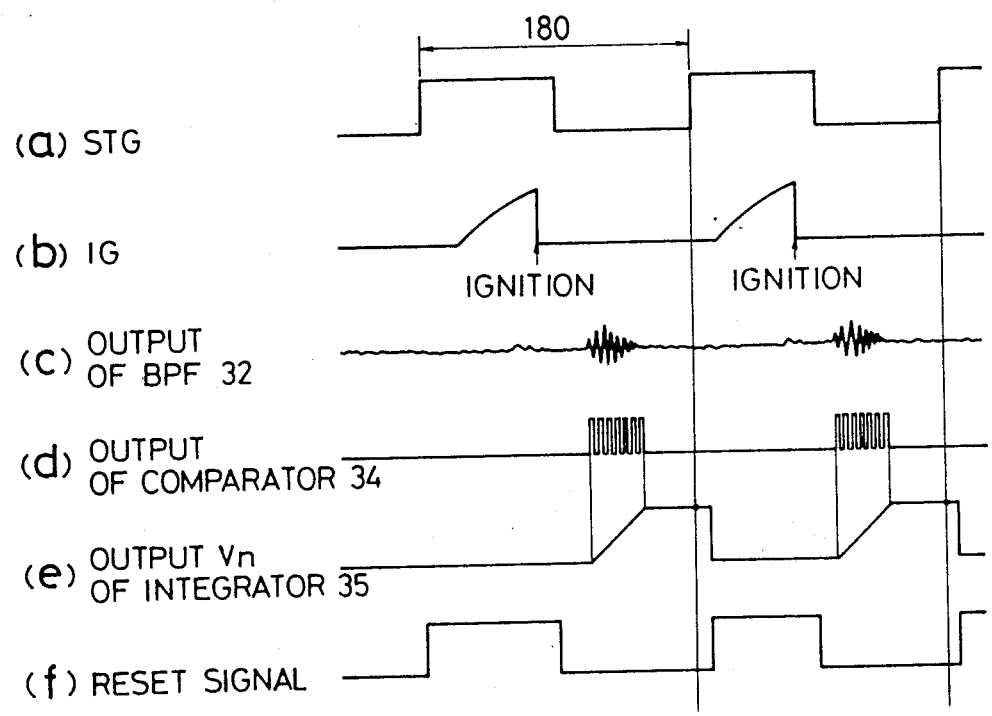
FIGS. 3, a-f are a timing chart of illustrating the operation of the knock detecting circuit 16a shown in FIG. 2.

Referring first to FIG. 3, a method of detecting the knock level of the engine 10, by means of the knock sensor 26 and the knock detector circuit 16a, will be described. Each time the crank angle position sensor 22 detects the predetermined crank angle position (75° before the top dead center (BTDC) of the suction stroke), it delivers a predetermined crank angle position signal STG (see FIG. 3(a)) which maintains the high level throughout a predetermined crank angle (e.g., 70°). An output signal from the knock sensor 26, which has detected a vibration propagated through the cylinder block of the engine 10, is filtered (see FIG. 3(c)) by means of the BPF 32. The output of the BPF 32 mixedly contains a noise signal and a knock signal. The comparator 34 separate the knock signal from the noise signal, and delivers a high-level signal (see FIG. 3(d)) while the knock signal is being inputted at a level higher than a predetermined threshold value. The integrator 35 detects the high-level signal from the comparator 34 with every predetermined period of time. Each time it detects the high-level signal, the integrator 35 delivers a knock-level signal Vn which increases by a fixed value at a time, and holds this signal level. The integrator 35 is constructed so as to be reset by means of a reset signal (see FIG. 3(f)) which is synchronous with the predetermined crank angle position signal STG. Therefore, the knock-level signal Vn of the integrator 35 corresponds to the level of a knock produced between each two adjacent BTDC-75° positions. On production of the predetermined crank angle position signal STG, the output level of the integrator 35 is converted into a digital signal by the A/D converter, and is read by the CPU.

Referring now to FIGS. 4 to 11, the sequence of ignition timing control by means of the electronic control unit 16 will be described.

Figure 4:
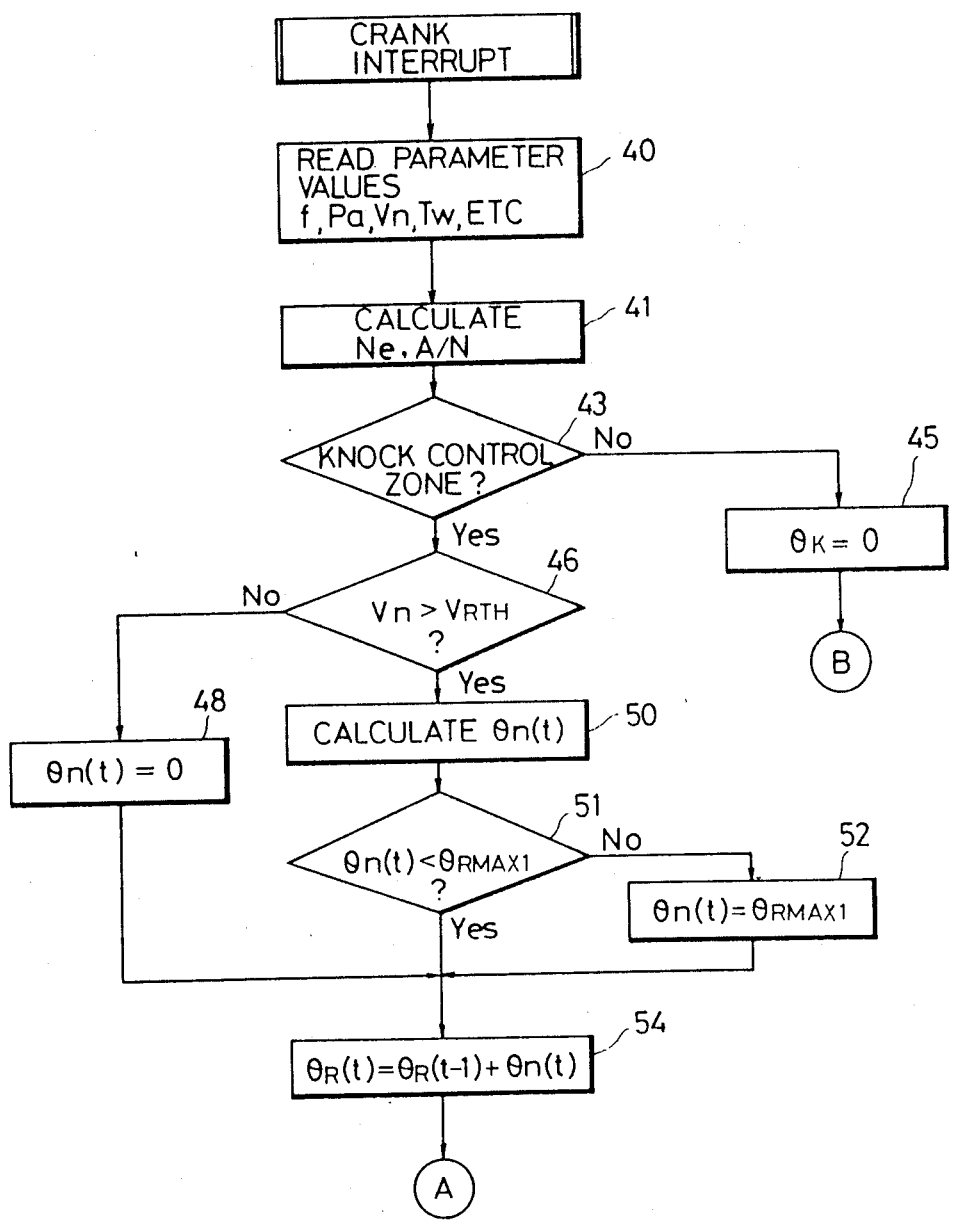
FIGS. 4 and 5 are flow charts for illustrating a sequence of ignition timing setting operations executed by means of the elecronic control unit 16 shown in FIG. 1.
Figure 5:
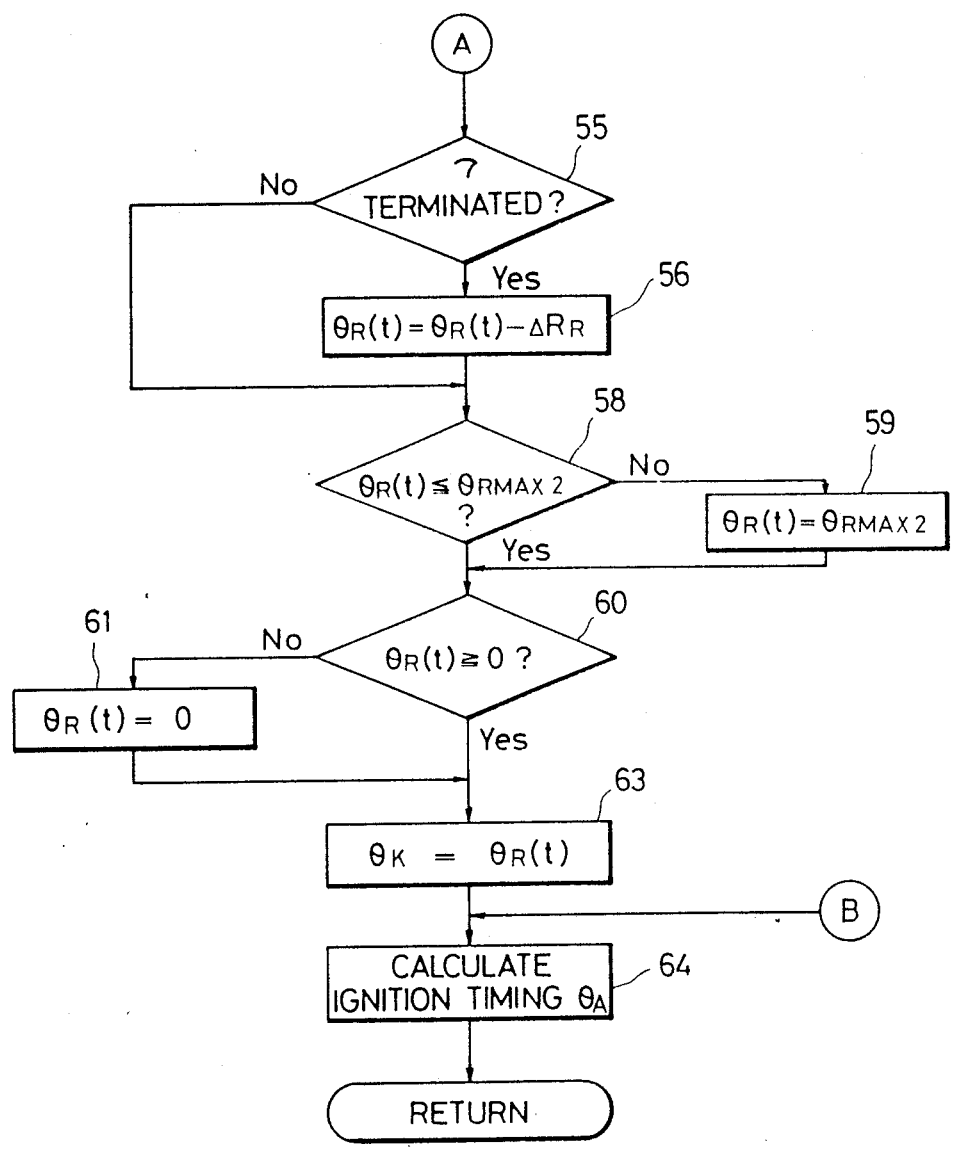

The program flow charts of FIGS. 4 and 5 illustrate the sequence of operations for calculating the optimum ignition timing for the properties of the fuel and the operating conditions of the engine 10. Each time the crank angle position sensor 22 detects the predetermined crank angle position (BTDC-75°), the electronic control unit 16 executes the program shown in FIGS. 4 and 5.

First, the electronic control unit 16 reads the signal values of the various aforementioned sensors, i.e., the Kárman vortex generation period signal f, throttle valve opening $\theta t$, intake-air temperature Ta, cooling-water temperature Tw, atmospheric pressure Pa, knock level Vn, etc. These signal values are stored in the aforementioned memories, and the on/off state of the OSS 25 is detected and stored in the memories (Step 40). The program then proceeds to Step 41, whereupon the engine speed Ne and intake-air quantity A/N are calculated. The engine speed Ne is calculated on the basis of the time interval between the point of time of the input of the preceding STG-signal and the instant that the present STG-signal is generated. The intake-air quantity A/N is obtained as a mass flow quantity per suction stroke by multiplying an intake-air volume flow rate, which is obtained according to the Kárman vortex generation period signal f and the engine speed Ne, by an air density obtained from the atmospheric pressure Pa and the intake-air temperature Ta. The engine speed Ne and the intake-air quantity A/N are stored in the aforementioned RAM.

Figure 6:
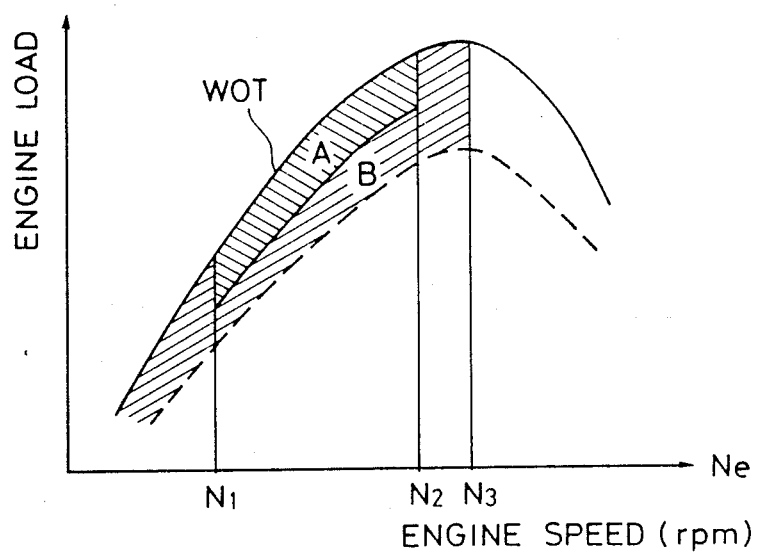
FIG. 6 is a graph showing a knock control operation region and a knock learning operation region of the internal combustion engine.

Subsequently, the electronic control unit 16 determines whether the engine 10 is operated within a knock-inducible operation region, i.e., knock control zone (Step 43). In FIG. 6, the knock control zone is indicated by a hatched region B, which is defined between a full-open load working line WOT of the throttle valve 18 and a load working line (indicated by the broken line), and is restricted by a predetermined engine speed N3 (e.g., 6,000 rpm). If the decision of Step 43 is No, that is, when the engine 10 is operated outside the region B, a knock control amount $\theta_K$ (mentioned later) is adjusted to zero (Step 45) since there is no possibility of knocking. Thereupon, the program proceeds to Step 64 of FIG. 5, as mentioned later.

If the decision of Step 43 is YES, that is, when the engine 10 is operated within the knock control zone, whether the knock level Vn is higher than a predetermined threshold value $V_{RTH}$ is determined (Step 46). If the decision of Step 46 is NO, a present retard change amount $\theta n(t)$ is adjusted to zero (Step 48), and the program advances to Step 54, as mentioned later.

If the decision of Step 46 is YES, the program proceeds to Step 50, whereupon the present retard change amount $\theta n(t)$ is calculated as follows:

$$\theta n(t) = (Vn - V_{RTH}) \times K1, \tag{1}$$

where K1 is a predetermined coefficient. The present retard change amount $\theta n(t)$ calculated according to equation (1) is compared with a predetermined maximum allowable value $\theta_{RMAX1}$ (STEP 51). If the value $\theta n(t)$ is smaller than the maximum allowable value $\theta_{RMAX1}$, the program proceeds directly to Step 54. If the value $\theta n(t)$ is greater than the value $\theta_{RMAX1}$, the former is readjusted to the latter (Step 52), and the program proceeds to Step 54. It is not advisable, in view of drivability, to change the retard amount drastically, so that the retard amount is restricted.

In Step 54, the present retard amount $\theta_R(t)$ is calculated as follows:

$$\theta_R(t) = \theta_R(t-1) + \theta n(t), \tag{2}$$

where $\theta_R(t-1)$ is the retard amount calculated during the preceding execution of the program, and the present retard amount is obtained by adding the present retard change amount $\theta n(t)$ to the preceding retard amount $\theta_R(t-1)$.

The program then proceeds to Step 55, in which whether a predetermined time $\tau$ (e.g., 0.2 to 1.0 second) has passed after the preceding execution of Step 56 (mentioned later) is determined. If the passage of the predetermined time $\tau$ is not detected, that is, if the decision of Step 55 is NO, the program proceeds to Step 58 without changing the present retard amount $\theta_R(t)$ set in Step 54. If the decision of Step 55 is YES, a predetermined fine retard amount $\Delta R_R$ is subtracted from the present retard amount $\theta_R(t)$ set in Step 54, and the remainder is reset as the present retard amount $\theta_R(t)$. Thereafter, the program proceeds to Step 58.

$$\theta_R(t) = \theta_R(t) - \Delta R_R \tag{3}$$

In Steps 58 to 61, whether the set present retard amount $\theta_R(t)$ is within a predetermined range is determined. More specifically, whether the amount $\theta_R(t)$ is not greater than an upper limit value $\theta_{RMAX2}$ is determined in Step 58, and whether it is not smaller than a lower limit value (zero) is determined in Step 60. If the present retard amount $\theta_R(t)$ is greater than the upper limit value $\theta_{RMAX2}$ or smaller than the lower limit value 0, it is readjusted to the limit value (Step 59 or 61), and is stored as a knock control amount $\theta_K$ in the memories.

$$\theta_K = \theta_R(t). \tag{4}$$

Using the knock control amount $\theta_K$ set in this manner, the electronic control unit 16 calculates the ignition timing $\theta_A$ as follows (Step 64):

$$\theta_A = \theta_B + \max(\theta_{WT}, \theta_{AP}) + \theta_{AT} - \theta_K, \tag{5}$$

wheree $\theta_B$ is a basic ignition timing. A method of setting the timing $\theta_B$ will be mentioned later. $\theta_{WT}$ and $\theta_{AP}$ are a water-temperature correction and an atmospheric pressure correction, respectively. The water-temperature correction $\theta_{WT}$ is set in accordance with a cooling-water temperature $T_W$ detected by the engine-water temperature sensor 23, while the atmospheric pressure correction $\theta_{AP}$ is set in accordance with the atmospheric pressure Pa detected by the atmospheric pressure sensor 24. The greater one of the corrections $\theta_{WT}$ and $\theta_{AP}$ is added to the basic ignition timing $\theta_B$. $\theta_{AT}$ is an intake-air temperature correction, which is set in accordance with the intake-air temperature detected by the intake-air temperature sensor 21.

The basic ignition timing $\theta_B$ is set as follows:

$$\theta_B = K_{NK} \cdot \theta_P + (1 - K_{NK}) \cdot \theta_R, \tag{6}$$

where $\theta_P$ and $\theta_R$ are ignition timings calculated on the basis of values read from ignition timing maps prepared for premium-octane gasoline (hereinafter referred to simply as RON-95) and regular-octane gasoline (hereinafter referred to simply as RON-91), respectively. FIG. 7 shows the ignition timing map for the RON-95 stored in the memories of the electronic control unit 16. Using the conventional 4-point interpolation method, for example, the ignition timing $\theta_P$, which corresponds to the engine speed Ne and the intake-air quantity A/N calculated and stored in Step 41, is read from the map of FIG. 7 and calculated. The ignition timing map (not shown) for the RON-91, which is also stored in the memories, resembles the map for the RON-95 shown in FIG. 7. Like the ignition timing $\theta_P$, the ignition timing $\theta_R$, which corresponds to the engine speed Ne and the intake-air quantity A/N, is read from the ignition timing map for the RON-91 and calculated. The values corresponding to the engine speed Ne and the intake-air quantity A/N, which are common to the ignition timing maps for the RON-95 and RON-91, are set so that the value read from the map for the RON-95 is greater than or on the advance side of the value read from the map for the RON-91.

$K_{NK}$ is a knock learning correction, which is adjusted to a value within a range of 0 to 1.0 according to a setting routine for the knock learning correction $K_{NK}$ mentioned later. The greater the value of the knock learning correction $K_{NK}$, the nearer to the value read from the ignition timing map for the RON-95, i.e., the deeper on the advance side, the value of the basic ignition timing $\theta_B$, calculated according to equation (6), will be.

Figure 8:
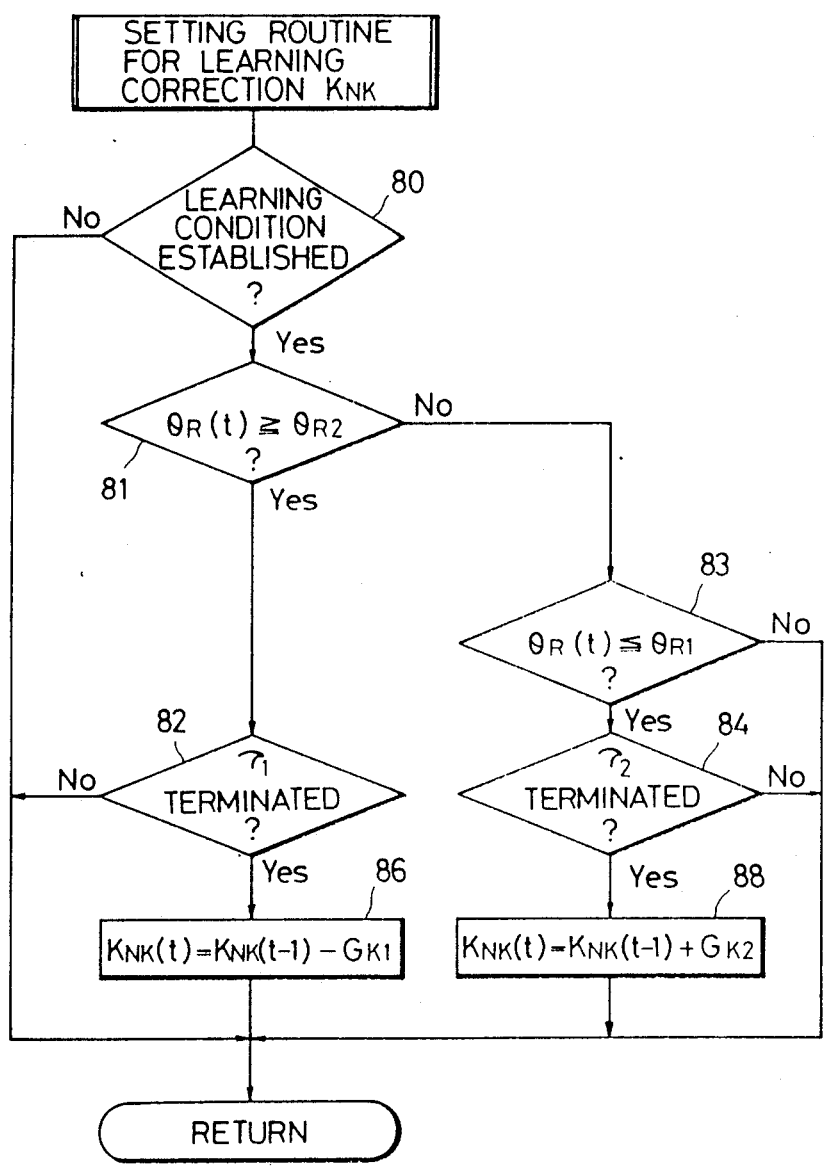
FIG. 8 is a flow chart of a setting routine for a knock learning correction $K_{NK}$.
Figure 9:
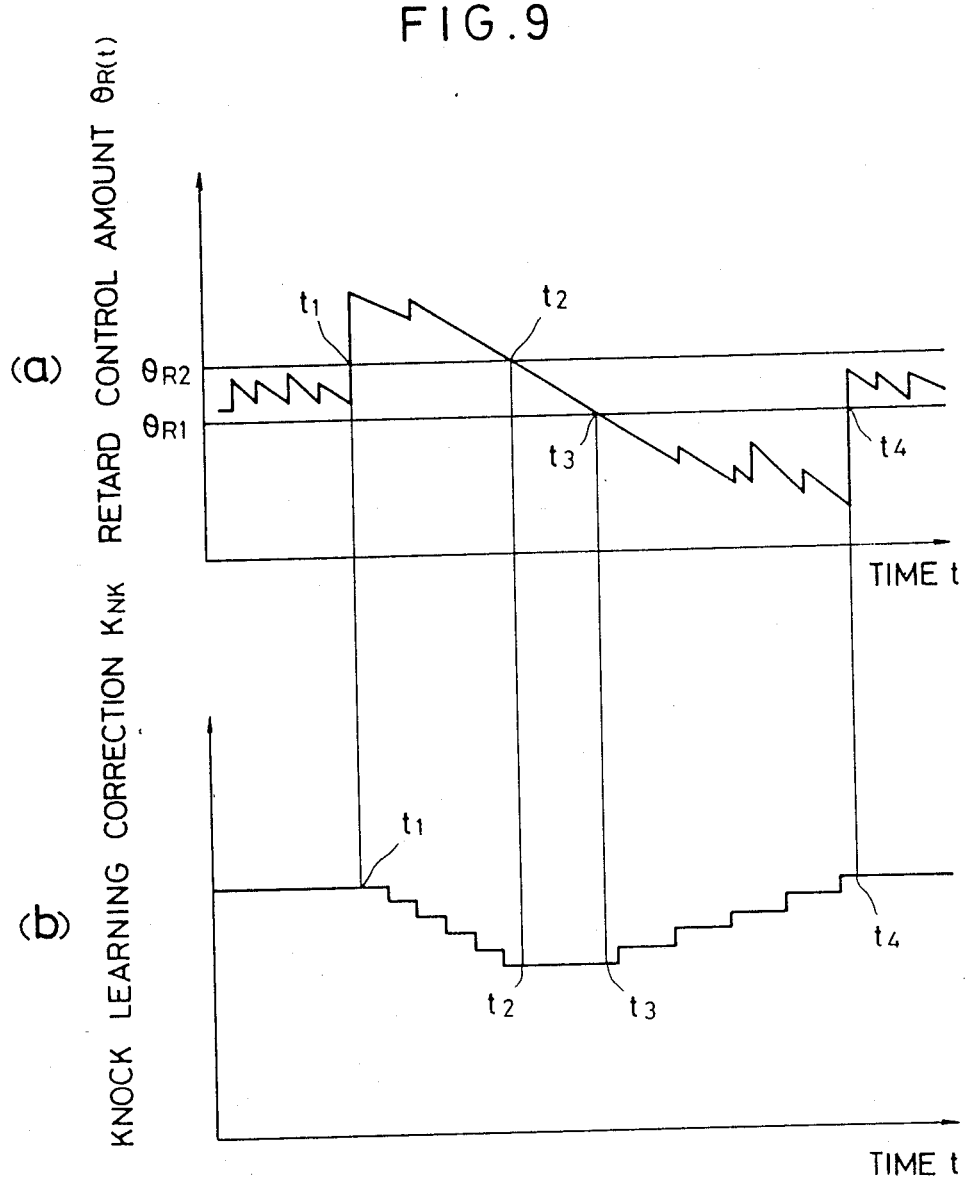
FIGS. 9, a and b are a timing chart showing the relationship between the respective time-based transitions of a retard control amount $\theta_R$ (t) and the knock learning correction $K_{NK}$.

The knock learning correction $K_{NK}$ is set according to its setting routine shown in FIG. 8. In Step 80 of FIG. 8, the electronic control unit 16 first determines whether a learning condition to require the knock learning correction $K_{NK}$ to be updated is established. This learning condition is fulfilled when the engine 10 is operated within an operation region A shown in FIG. 6, i.e., a higher-load region of the operation region B, the engine speed Ne is not higher than a predetermined maximum speed N2 (e.g., 5,000 rpm; lower than the predetermined speed N3), and is not lower than a predetemined minimum speed N1 (e.g., 1,800 rpm), the cooling-water temperature detected by the engine-water temperature sensor 23 is not lower than a predetermined value (e.g., 80° C.), the engine operation is stable, and the engine 10 is operated within the knock-inducible operation region. If the aforesaid learning condition is not established, the present routine is finished without any change.

If the decision of Step 80 is YES, that is, if the aforementioned learning condition is established, the program proceeds to Step 81, whereupon whether the present retard amount $\theta_R(t)$ set in FIGS. 4 and 5 is not smaller than a predetemined upper limit value $\theta_{R2}$ is determined. If the decision of Step 81 is NO, the program advances to Step 83, whereupon whether the present retard amount $\theta_R(t)$ is not greater than a predetermined lower limit value $\theta_{R1}$, which is smaller than the upper limit value $\theta_{R2}$, is determined. If the decision of Step 83 is NO, that is, if the present retard amount $\theta_R(t)$ takes a value between the upper and lower limit values (before time t1 of FIG. 9(a)), the present routine is finished without changing the knock learning correction $K_{NK}$ at all.

If the engine 10 knocks so that the present retard amount $\theta_R(t)$ exceeds the predetermined upper limit value $\theta_{R2}$, that is, if the decision of Step 81 is YES, the program proceeds to Step 82. Thereupon, whether a first predetermined integration time interval $\tau1$, immediately after the start of the execution of Step 82, is terminated is determined. If the time interval $\tau1$ is not terminated yet, the knock learning correction $K_{NK}$ is kept at the preceding value without being changed. If the respective decisions of Steps 80 and 81 both continue to be YES, the determination of Step 82 is repeated. Each time the predetermined time interval $\tau1$ is terminated, the program proceeds to Step 86, whereupon a first predetermined integration gain $G_{K1}$ is subtracted from the preceding value $K_{NK}(t-1)$ of the knock learning correction. Thus, a value smaller than the preceding value is given as a new present knock learning correction $K_{NK}(t)$ (between times t1 and t2 of FIG. 9(b)).

If the present retard amount $\theta_R(t)$ takes a value between the upper and lower limit values $\theta_{R2}$ and $\theta_{R1}$ again (between times t2 and t3 of FIG. 9(a)), the knock learning correction $K_{NK}$ is kept again at the preceding value (between times t2 and t3 of FIG. 9(b)). If the engine 10 does not continue to knock any more, the predetermined fine retard amount $\Delta R_R$ is subtracted from the present retard amount $\theta_R(t)$ with every passage of the predetermined time $\tau$, as mentioned before. Thus, the present retard amount $\theta_R(t)$ is gradually reduced to a value smaller than the predetermined lower limit value $\theta_{R1}$, so that the decisions of Steps 81 and 83 become NO and YES, respectively.

If the decision of Step 83 is YES, the electronic control unit 16 executes Step 84, whereupon a second predetermined integration time interval $\tau2$, immediately after the start of the execution of Step 84, is terminated is determined. If the time interval $\tau2$ is not terminated yet, the knock learning correction $K_{NK}$ is kept at the preceding value without being changed. If the respective decisions of Steps 80 and 83 both continue to be YES, and if the decision of Step 81 continues to be NO, the determination of Step 84 is repeated. Each time the predetermined time interval $\tau2$ is terminated, the program proceeds to Step 88, whereupon a second predetermined integration gain $G_{K2}$ is added to the preceding value $K_{NK}(t-1)$ of the knock learning correction. Thus, a value greater than the preceding value is given as a new present knock learning correction $K_{NK}(t)$ (between times t3 and t4 of FIG. 9(b)). If the present retard amount $\theta_R(t)$ takes a value between the upper and lower limit values $\theta_{R2}$ and $\theta_{R1}$ again (on and after time t4 of FIG. 9(a)), the knock learning correction $K_{NK}$ is kept again at the preceding value (on and after time t4 of FIG. 9(b)). The correction $K_{NK}$ is stored in the nonvolatile RAM contained in the electronic control unit 16, and the stored value is maintained even after the engine 10 is stopped.

Figure 10:
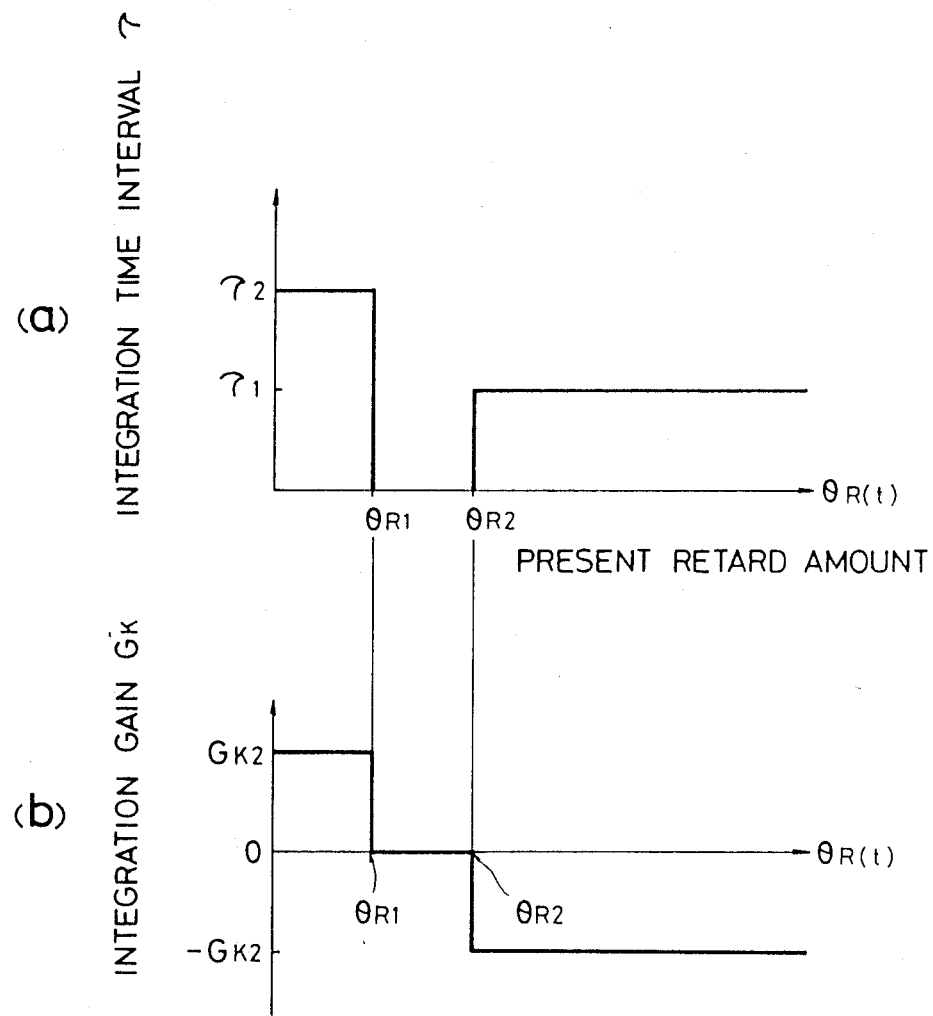
FIGS. 10, a and b are a graph showing the retard control amount $\theta_R$ (t) compared with integration time intervals $\tau 1$ and $\tau 2$ and integration gains $G_{K1}$ and $G_{K2}$.

FIG. 10 shows the retard amount $\theta_R(t)$ compared with the integration time intervals $\tau1$ and $\tau2$ and the integration gains $G_{K1}$ and $G_{K2}$. In the present embodiment, the absolute values of the integration gains $G_{K1}$ and $G_{K2}$ are equal, the integration time interval $\tau2$, which is set when the retard amount $\theta_R(t)$ is not greater than the lower limit value $\theta_{R1}$, is greater than the integration time interval $\tau1$, which is set when the amount $\theta_R(t)$ is not smaller than the upper limit value $\theta_{R2}$, and the time interval for the addition of the integration gain $G_{K2}$ is longer than the time interval for the subtraction of the integration gain $G_{K1}$. The correction gain is changed by thus setting these values. Moreover, nonsensitive zones are provided in which the knock learning correction $K_{NK}$ is kept at the preceding value when the retard amount $\theta_R(t)$ takes a value between the upper and lower limit values $\theta_{R2}$ and $\theta_{R1}$. These nonsensitive zones serve to stabilize the control.

The method of changing the correction gain is not limited to the embodiment described above, and the same effect as aforesaid can be obtained by setting the values so that the integration time intervals $\tau1$ and $\tau2$ are equivalent, and that the integration gain $G_{K2}$ is smaller than $G_{K1}$. In the above embodiment, moreover, the nonsensitive zones are provided so that the knock learning correction $K_{NK}$ is held as it is when the present retard amount $\theta_R(t)$ takes a value between the predetermined upper and lower limit $\theta_{R2}$ and $\theta_{R1}$. In some cases, however, the nonsensitive zones need not be provided.

Figure 11:
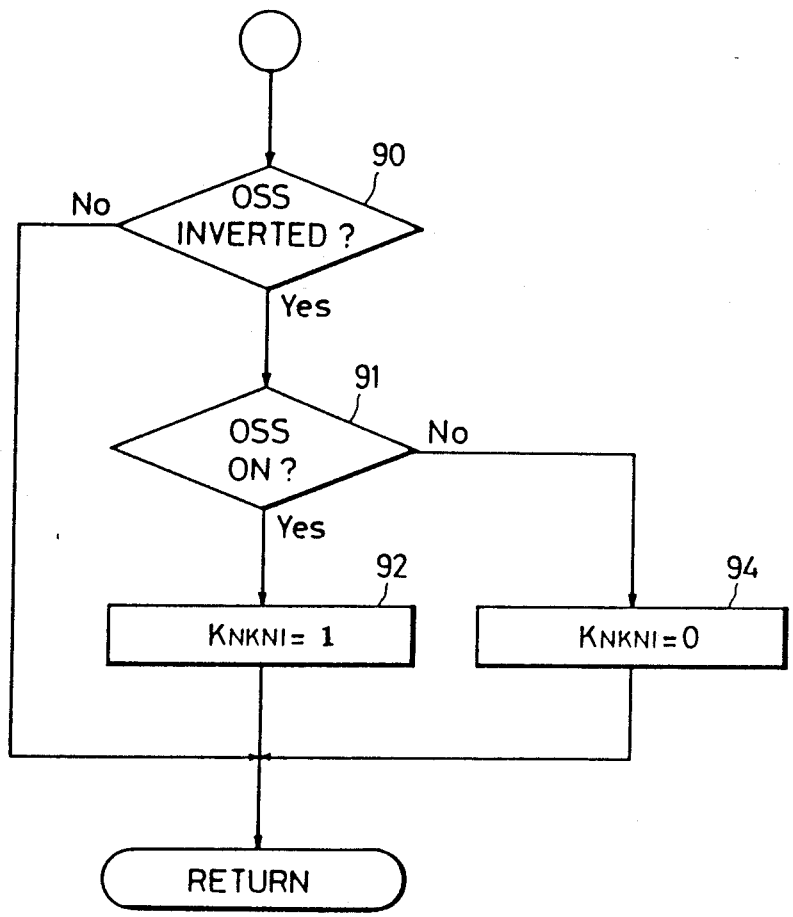
FIG. 11 is a program flow chart showing a sequence of operations for setting the initial value of the knock learning correction $K_{NK}$.

The initial value of the knock learning correction $K_{NK}$ is set depending on the shift position of the OSS 25 when the OSS 25 is shifted. More specifically, the electronic control unit 16 first determines whether the OSS 25 is shifted so that its output is inverted (Step 90), as shown in FIG. 11. If the decision of Step 90 is NO, the current value of the correction $K_{NK}$ is maintained without being updated. If the decision of Step 90 is YES, whether the OSS 25 is on is determined (Step 91). If the decision of Step 91 is YES, that is, when the OSS 25 is on, the initial value of the knock learning correction $K_{NK}$ is set to 1, which is indicative of the use of the RON-95 (premium-octane gasoline) (Step 92). If the decision of Step 91 is NO, that is, when the OSS 25 is off, the initial value of the correction $K_{NK}$ is set to 0, which is indicative of the use of the RON-91 (regular-octane gasoline) (Step 94). The initial value of the knock learning correction $K_{NK}$ is stored in the nonvolatile RAM.

In the determination of Step 91, it may be concluded that the OSS 25 is on or off only when the on- or off-state continues for a predetermined period of time (e.g., one second). If a battery backup line of the nonvolatile RAM is removed during maintenance work, for example, the initial value of the knock learning correction $K_{NK}$ may be set after the on/off state of the OSS 25 is determined, in the same manner as aforesaid, at the time of connecting the backup line.

Thus, the basic ignition timing $\theta_B$ can be adjusted to an optimum value for the properties of the fuel used, on the basis of the knock learning correction $K_{NK}$.

Returning to Step 64 of FIG. 5, the electronic control unit 16 delivers the ignition signal to the igniter unit 28 in accordance with the ignition timing $\theta_A$ calculated and set in the aforementioned manner, thereby causing the igniter unit 28 to ignite an air-fuel mixture at the crank angle position corresponding to the ignition timing $\theta_A$.

Figure 12:
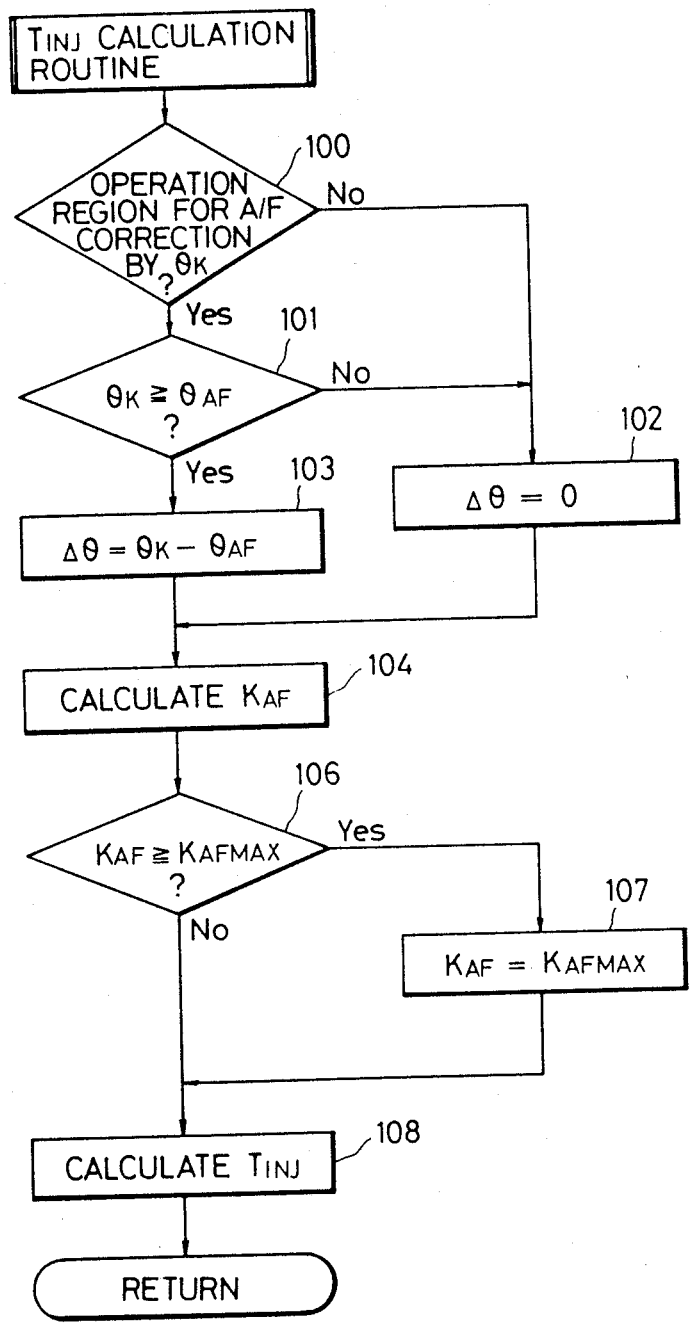
FIG. 12 is a flow chart for illustrating a sequence of operations for setting a valve-opening drive time $T_{INJ}$ of a fuel injection valve 20, executed by means of the electronic control unit 16 shown in FIG. 1.
Figure 13:
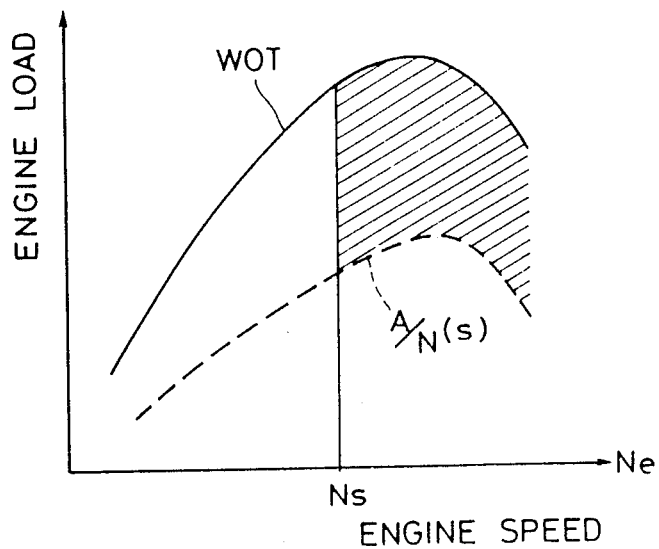
FIG. 13 is a graph showing an engine operation region in which air-fuel ratio is to be corrected by means of a knock control amount $\theta_K$.
Figures 14, 15:
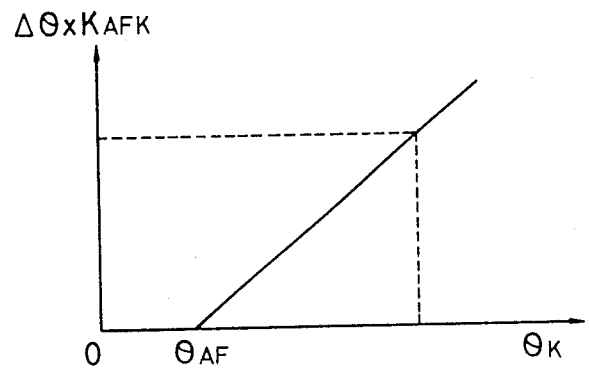
FIG. 14 is a graph showing the relationship between a retard A/F correction ($\Delta\theta \times K_{AFK}$) and the knoock control amount $\theta_K$.
FIG. 15 is a diagram showing an A/F correction map for premium-octane gasoline from which an A/F correction factor $K_{AFP}$ is read in accordance with the engine speed Ne and the intake-air quantity A/N.

Referring now to FIGS. 12 to 14, an air-fuel ratio control method according to the present invention will be described. The flow chart of FIG. 12 shows a sequence of arithmetic operations for a valve-opening drive time $T_{INJ}$ of the fuel injection valves 20. The electronic control unit 16 first determine whether the engine is being operated within a predetermined operation region in which the air-fuel ratio is to be corrected by means of the knock control amount $\theta_K$ (Step 100). In this predetermined operation region, the air-fuel ratio is corrected to take a value on the rich side, in accordance with an instantaneous knock amount detected by means of the knock learning sensor 26. As indicated by hatching in FIG. 13, this operation region is a high-speed, high-load operation region for a predetermined engine speed Ns (e.g., approximately 3,000 rpm) or higher speed, which is defined between the full-open load working line WOT of the throttle valve 18 and a predetermined partial load working line A/N(s). IF the engine 10 is not being operated within this operation region, that is, if the decisions of Step 100 is NO, the program proceeds to Step 102 since there is no possibility of an exhaust system's burning or the like. Thereupon, the value of a deviation $\Delta\theta$ (mentioned later) is adjusted to 0. If the deviation $\Delta\theta$ is adjusted to zero, the correction of the instantaneous air-fuel ratio by means of the knock control amount $\theta_K$ is not effected.

If the decision of Step 100 is YES, the program proceeds to Step 101, whereupon the electronic control unit 16 determines whether the knock control amount $\theta_K$ set in Step 45 of FIG. 4 and Step 63 of FIG. 5 is not smaller than a predetermined threshold value $\theta_{AF}$. If the knock control amount $\theta_K$ is smaller than the threshold value $\theta_{AF}$, the program proceeds to Step 101, whereupon the deviation $\Delta\theta$ is adjusted to zero. If the knock control amount $\theta_K$ is not smaller than the threshold value $\theta_{AF}$, the program proceeds to Step 103, whereupon the deviation $\Delta\theta$ ($=\theta_K-\theta_{AF}$) between the knock control amount $\theta_K$ and the predetermined thresholed value $\theta_{AF}$ is calculated. A retard A/F correction is the product of the deviation $\Delta\theta$, calculated in Steps 100 to 103, and a retard A/F correction factor $K_{AFK}$. FIG. 14 shows the relationship between the retard A/F correction ($\Delta\theta \times K_{AFK}$) and the knock control amount $\theta_K$. As seen from FIG. 14, the range between 0 and $\theta_{AFK}$, with respect to the knock control amount $\theta_K$, is a nonsensitive zone in which the deviation $\Delta\theta$ is set to zero. If the knock control amount $\theta_K$ takes a value within this nonsensitive zone, enrichment (mentioned later) of the air-fuel ratio corresponding to the amount $\theta_K$ is not effected.

Subsequently, electronic control unit 16 calculates an A/F correction factor $K_{AF}$ as follows:

$$K_{AF} = K_{NK} \cdot K_{AFP} + (1 - K_{NK}) \times K_{AFR} + \Delta\theta \cdot K_{AFK}. \tag{7}$$

Here $K_{NK}$ is the same knock learning correction as the one set in Step 86 or 88 and used for the calculation of the basic ignition timing $\theta_B$, and $K_{AFP}$ and $K_{AFR}$ are A/F correction factors calculated on the basis of values read from A/F correction maps prepared for the RON-95 (premium-octane gasoline) and the RON-91 (regular-octane gasoline), respectively. FIG. 15 shows the A/F correction map for the RON-95 stored in the memories of the electronic control unit 16. Using the conventional 4-point interpolation method, the A/F correction factor $K_{AFP}$, which corresponds to the engine speed Ne and the intake-air quantity A/N calculated and stored in Step 41 of FIG. 4, is read from the map of FIG 15 and calculated. The A/F correction map (not shown) for the RON-91, which is also stored in the memories, resembles the correction map for the RON-95 shown in FIG. 15. Like the A/F correction factor $K_{AFP}$, the A/F correction factor $K_{AFR}$, which corresponds to the engine speed Ne and the intake-air quantity A/N, is read from the A/F correction map for the RON-91 and calculated. The values corresponding to the engine speed Ne and the intake-air quantity A/N, which are common to the A/F correction maps for the RON-95 and RON-91, are set so that the value read from the correction map for the RON-95 is smaller than or on the fuel-lean side of the value read from the correction map for the RON-91.

The A/F correction factor $K_{AF}$ calculated according to equation (7) is checked for its upper limit value in Step 106. More specifically, whether the value of the A/F correction factor $K_{AF}$ is not smaller than a predetermined upper limit value $K_{AFMAX}$ is determined in Step 106. If the value of the factor $K_{AF}$ is smaller than the upper limit value $K_{AFMAX}$, the program proceeds to Step 108 without changing the value $K_{AF}$. If the value $K_{AF}$ is not smaller than the upper limit value $K_{AFMAX}$, the A/F correction factor is readjusted to the value $K_{AFMAX}$ in Step 107, whereupon the program proceeds to Step 108.

USing the A/F correction factor $K_{AF}$ set in this manner, the valve-opening drive time $T_{INJ}$ of the fuel injection valves 20 is calculated in Step 108 as follows:

$$T_{INJ} = T_B \cdot K_{AF} \cdot K2 \cdot K3 + Tb, \tag{8}$$

where $T_B$ is a basic drive time, which is calculated on the basis of a value read from a basic drive time map stored in the ROM of the electronic control unit 16, in accordance with the engine speed Ne and the intake-air quantity A/N. K2 is A/N learning correction factor, and K3 is another correction factor for cooling-water temperature correction, acceleration correction, etc. The A/N learning correction factor K2 is set in accordance with a detection value of the $O_2$ concentration of exhaust gas, and is obtained as a time mean value of an O₂ feedback correction factor for the feedback control of the air-fuel ratio to a predetermined value (theoretical air-fuel ratio). Tb is an injection valve operation dead time correction set corresponding to the battery voltage and the like.

Based on the valve-opening drive time $T_{INJ}$ set in this manner, the electronic control unit 16 can deliver a drive signal to the fuel injection valve 20, thereby causing the engine 10 to be supplied with a quantity of fuel corresponding to the optimum air-fuel ratio for the retard amount of the ignition timing.

In the embodiment described above, the valve-opening drive time $T_{INJ}$ is obtained by multiplying the basic drive time $T_B$ by the A/F correction factor $K_{AF}$ which is set in accordance with the knock learning correction $K_{NK}$ and the knock control amount $\theta_K$. The present invention is not, however, limited to this embodiment, and various modifications may be applied to the method for correcting the quantity of fuel injection into the engine 10 by means of the knock amount. For example, the basic drive time $T_B$ may be calculated according to the following equation (9) similar to equation (6) which is used to calculate the basic ignition timing $\theta_R$.

$$T_B = K_{NK} \cdot T_P + (1 - K_{NK}) \cdot T_R, \tag{9}$$

where $T_P$ and $T_R$ are basic drive times calculated on the basis of values read from basic drive time maps prepared for the RON-95 and RON-91, respectively, in accordance with the engine speed Ne and the intake-air quantity A/N. In this case, the A/F correction factor $K_{AF}$ may be calculated as follows:

$$K_{AF} = 1 + \Delta\theta \cdot K_{AFK}. \tag{10}$$

Moreover, the output of the knock sensor 26 may be connected to a knock detector circuit formed of an analog circuit, in place of the knock detector circuit 16a. This analog circuit may, for example, be a charge and discharge circuit, which is quickly charged when a knock is produced, and is gradually discharged when no knock is produced, without being reset by means of the reset signal every time the predetermined crank angle position signal STG is generated.

In the embodiment described above, the ignition device is provided with an electronic advance unit. Alternatively, however, it may be provided with a knock retard unit as well as an advance unit which includes a so-called vacuum advancer and a governor. The vacuum advancer serves to advance the ignition timing as a negative suction-passage pressure increases, while the governor advances the ignition timing with the increase of the engine speed.

Furthermore, the air-fuel ratio adjusting device may be a fuel injection device, as in the case of the aforementioned embodiment, or an electronically-controlled carburetor which is provided with an electromagnetic solenoid valve for opening/closing the main jet (orifice) in accordance with a duty factor. Alternatively, the air-fuel ratio adjusting device may be constructed so that a by-pass valve is attached to an air passage which by-passes a carburetor, whereby the air-fuel ratio can be variably adjusted by controlling the opening of the by-pass valve.

What is claimed is:

1. A control apparatus of an internal combustion engine which has air-fuel ratio control means for controlling the operation of an air-fuel ratio adjusting device for adjusting the air-fuel ratio of an air-fuel mixture to be supplied to the engine, and ignition timing control means for controlling the operation of an ignition device for igniting the air-fuel mixture supplied to the engine, comprising:

knock detecting means for detecting a knocking state of the engine, said knock detecting means delivering a knock signal corresponding to the detected knocking state when the knocking state is detected thereby; and correction data calculating means for calculating a value of first correction data tending to change to a high degree, thereby preventing said knocking state, and a value of second correction data tending to change to a low degree, thereby preventing said knocking state, in response to said knock signal delivered from said knock detecting means;

the value of said first correction data being calculated so as to change in a first direction when said knock signal is delivered, and to change in a second direction opposite to said first direction when said knock signal is not delivered;

the value of said second correction data being calculated so as to change in a third direction when the value of said first correction data changes in said first direction to get beyond a preset value or range, and to change in a fourth direction opposite to said third direction when the value of said first correction data changes in said second direction;

said ignition timing control means including means for setting the ignition timing on the delay side when the value of said first correction data changes in said first direction, for setting the ignition timing on the advance side when the value of said first correction data changes in said second direction, for setting the ignition timing on the delay side when the value of said second correction data changes in said third direction, and for setting the ignition timing on the advance side when the value of said second correction data changes in said fourth direction; and said air-fuel ratio control means including means for adjusting the air-fuel ratio to a value on the fuel-rich side when the value of said first correction data changes in said first direction, and for adjusting the air-fuel ratio to a value on the fuel-lean side when the value of said first correction data changes in said second direction.

2. The control apparatus according to claim 1, which further comprises load detecting means for detecting the load of the engine and speed detecting means for detecting the speed of the engine; and wherein said air-fuel ratio control means sets basic air-fuel ratio data in accordance with the engine load detected by said load detecting means and the engine speed detected by said speed detecting means, so that the air-fuel ratio is set by correcting said basic air-fuel ratio data in accordance with said first correction data, said first correction data being calculated to take a value between predetermined upper and lower limit values so that said basic air-fuel ratio data is corrected to take a value on the fuel-rich side in accordance with the deviation between said first correction data and a predetermined reference value between said upper and lower limit values when the value of said first correction data changes in said first direction to get beyond said reference value, and that the correction of said basic air-fuel ratio data by means of said first correction data is stopped when the value of said first correction data changes in said second direction to get beyond said reference value.

3. The control apparatus according to claim 1, which further comprises load detecting means for detecting the load of the engine, speed detecting means for detecting the speed of the engine, and operating state detecting means for detecting a predetermined high-speed, high-load operating state of the engine; and wherein said air-fuel ratio control means is constructed so as to set basic air-fuel ratio data in accordance with the engine load detected by said load detecting means and the engine speed detected by said speed detecting means, so that the air-fuel ratio is set by correcting said basic air-fuel ratio data in accordance with said first correction data, the correction of said basic air-fuel ratio data by means of said first correction data being effected only when said predetermined high-speed, high-load operating state is detected by said operating state detecting means.

4. The control apparatus according to claim 1, wherein said correction data calculating means includes nonvolatile memory means for retentively storing said second correction data even after the operation of the engine is stopped, whereby said second correction data stored in said memory means is used when the engine is operated thereafter.

5. The control apparatus according to claim 1, wherein said correction data calculating means includes switch means capable of being selectively shifted, by manual operation, between a first shift position to provide initial correction data adapted for a high-octane fuel and a second shift position to provide initial correction data adapted for a low-octane fuel, whereby the initial value of said second correction data is given depending on the shift position of said switch means.

6. A control apparatus of an internal combustion engine which has air-fuel ratio control means for controlling the operation of an air-fuel ratio adjusting device for adjusting the air-fuel ratio of an air-fuel mixture to be supplied to the engine, and ignition timing control means for controlling the operation of an ignition device for igniting the air-fuel mixture supplied to the engine, comprising:

knock detecting means for detecting a knocking state of the engine, said knock detecting means delivering a knock signal corresponding to the detected knocking state when the knocking state is detected thereby; and correction data calculating means for calculating a value of first correction data tending to change to a high degree, thereby preventing said knocking state, and a value of second correction data tending to change to a low degree, thereby preventing said knocking state, in response to said knock signal delivered from said knock detecting means;

the value of said first correction data being calculated so as to change in a first direction when said knock signal is delivered, and to change in a second direction opposite to said first direction when said knock signal is not delivered;

the value of said second correction data being calculated so as to change in a third direction when the value of said first correction data changes in said first direction to get beyond a preset value or range, and to change in a fourth direction opposite to said third direction when the value of said first correction data changes in said second direction;

said ignition timing control means including means for setting the ignition timing on the delay side when the value of said first correction data changes in said first direction, for setting the ignition timing on the advance side when the value of said first correction data changes in said second direction, for setting the ignition timing on the delay side when the value of said second correction data changes in said third direction, and for setting the ignition timing on the advance side when the value of said second correction data changes in said fourth direction; and said air-fuel ratio control means including means for adjusting the air-fuel ratio to a value on the fuel-rich side when the value of said second correction data changes in said third direction, and for adjusting the air-fuel ratio to a value on the fuel-lean side when the value of said second correction data changes in said fourth direction.

7. The control apparatus according to claim 6, wherein said air-fuel ratio control means stores first basic air-fuel ratio data adapted for a high-octane fuel and second basic air-fuel ratio data adapted for a low-octane fuel, calculates interior division point data of said stored first and second basic air-fuel ratio data in accordance with said second correction data, and sets the air-fuel ratio in accordance with said calculated interior division point data.

8. The control apparatus according to claim 6, wherein said correction data calculating means includes nonvolatile memory means for retentively storing said second correction data even after the operation of the engine is stopped, whereby said second correction data stored in said memory means is used when the engine is operated thereafter.

9. The control apparatus according to claim 6, wherein said correction data calculating means includes switch means capable of being selectively shifted, by manual operation, between a first shift position to provide initial correction data adapted for a high-octane fuel and a second shift position to provide initial correction data adapted for a low-octane fuel, whereby the initial value of said second correction data is given depending on the shift position of said switch means.

10. A control apparatus of an internal combustion engine which has air-fuel ratio control means for controlling the operation of an air-fuel ratio adjusting device for adjusting the air-fuel ratio of an air-fuel mixture to be supplied to the engine, and ignition timing control means for controlling the operation of an ignition device for igniting the air-fuel mixture supplied to the engine, comprising:

knock detecting means for detecting a knocking state of the engine, said knock detecting means delivering a knock signal corresponding to the detected knocking state when the knocking state is detected thereby; and correction data calculating means for calculating a value of first correction data tending to change to a high degree, thereby preventing said knocking state, and a value of second correction data tending to change to a low degree, thereby preventing said knocking state, in response to said knock signal delivered from said knock detecting means;

the value of said first correction data being calculated so as to change in a first direction when said knock signal is delivered, and to change in a second direction opposite to said first direction when said knock signal is not delivered;

the value of said second correction data being calculated so as to change in a third direction when the value of said first correction data changes in said first direction to get beyond a preset value or range, and to change in a fourth direction opposite to said third direction when the value of said first correction data changes in said second direction;

said ignition timing control means including means for setting the ignition timing on the delay side when the value of said first correction data changes in said first direction, for setting the ignition timing on the advance side when the value of said first correction data changes in said second direction, for setting the ignition timing on the delay side when the value of said second correction data changes in said third direction, and for setting the ignition timing on the advance side when the value of said second correction data changes in said fourth direction; and said air-fuel ratio control means including means for adjusting the air-fuel ratio to a value on the fuel-rich side when the value of said first correction data changes in said first direction, for adjusting the air-fuel ratio to a value on the fuel-lean side when the value of said first correction data changes in said second direction, for adjusting the air-fuel ratio to a value on the fuel-rich side when the value of said second correction data changes in said third direction, and for adjusting the air-fuel ratio to a value on the fuel-lean side when the value of said second correction data changes in said fourth direction.

11. The control apparatus according to claim 10, wherein said air-fuel ratio control means stores first basic air-fuel ratio data adapted for a high-octane fuel and second basic air-fuel ratio data adapted for a low-octane fuel, and calculates interior division point data of said stored first and second basic air-fuel ratio data in accordance with said second correction data, said calculated interior division point data serving as modified basic air-fuel ratio data, said first correction data being calculated to take a value between predetermined upper and lower limit values so that said modified basic air-fuel ratio data is corrected to take a value on the fuel-rich side in accordance with the deviation between said first correction data and a predetermined reference value between said upper and lower limit values when the value of said first correction data changes in said first direction to get beyond said reference value, and that the correction of said modified basic air-fuel ratio data by means of said first correction data is stopped when the value of said first correction data changes in said second direction to get beyond said reference value.

12. The control apparatus according to claim 10, which further comprises load detecting means for detecting the load of the engine, speed detecting means for detecting the speed of the engine, and operating state detecting means for detecting a predetermined high-speed, high-load operating state of the engine; and wherein said air-fuel ratio control means is constructed so as to set basic air-fuel ratio data in accordance with the engine load detected by said load detecting means and the engine speed detected by said speed detecting means, so that the air-fuel ratio is set by correcting said basic air-fuel ratio data in accordance with said first correction data, the correction of said basic air-fuel ratio data by means of said first correction data being effected only when said predetermined high-speed, high-load operating state is detected by said operating state detecting means.

13. The control apparatus according to claim 10, wherein said correction data calculating means includes nonvolatile memory means for retentively storing said second correction data even after the operation of the engine is stopped, whereby said second correction data stored in said memory means is used when the engine is operated thereafter.

14. The control apparatus according to claim 10, wherein said correction data calculating means includes switch means capable of being selectively shifted, by manual operation, between a first shift position to provide initial correction data adapted for a high-octane fuel and a second shift position to provide initial correction data adapted for a low-octane fuel, whereby the initial value of said second correction data is given depending on the shift position of said switch means.

15. A control apparatus of an internal combustion engine which has air-fuel ratio control means for controlling the operation of an air-fuel ratio adjusting device for adjusting the air-fuel ratio of an air-fuel mixture to be supplied to the engine, and ignition timing control means for controlling the operation of an ignition device for igniting the air-fuel mixture supplied to the engine, comprising:

knock detecting means for detecting a knocking state of the engine, said knock detecting means delivering a knock signal corresponding to the detected knocking state when the knocking state is detected thereby; and correction data calculating means for calculating a value of first correction data tending to change to a high degree, thereby preventing said knocking state, and a value of second correction data tending to change to a low degree, thereby preventing said knocking state, in response to said knock signal delivered from said knock detecting means;

the value of said first correction data being calculated so as to change in a first direction when said knock signal is delivered, and to change in a second direction opposite to said first direction when said knock signal is not delivered;

the value of said second correction data being calculated so as to change in a third direction when the value of said first correction data changes in said first direction to get beyond a preset value or range, and to change in a fourth direction opposite to said third direction when the value of said first correction data changes in said second direction to get beyond said preset range, said second correction data being maintained without being changed when said first correction data takes a value within said preset range;

said ignition timing control means including means for setting the ignition timing in accordance with said first and second correction data calculated by said correction data calculating means, and for controlling the operation of said ignition device on the basis of said set ignition timing; and said air-fuel ratio control means including means for setting the air-fuel ratio in accordance with at least one of said first and second correction data calculated by said correction data calculating means, and for controlling the operation of said air-fuel ratio adjusting device on the basis of said set air-fuel ratio.

16. The control apparatus according to claim 15, wherein said correction data calculating means includes nonvolatile memory means for retentively storing said second correction data even after the operation of the engine is stopped, whereby said second correction data stored in said memory means is used when the engine is operated thereafter.

17. The control apparatus according to claim 15 wherein said correction data calculating means includes switch means capable of being selectively shifted, by manual operation, between a first shift position to provide initial correction data adapted for a high-octane fuel and a second shift position to provide initial correction data adapted for a low-octane fuel, whereby the initial value of said second correction data is given depending on the shift position of said switch means.

18. A control apparatus of an internal combustion engine which has air-fuel ratio control means for controlling the operation of an air-fuel ratio adjusting device for adjusting the air-fuel ratio of an air-fuel mixture to be supplied to the engine, and ignition timing control means for controlling the operation of an ignition device for igniting the air-fuel mixture supplied to the engine, comprising:

knock detecting means for detecting a knocking state of the engine, said knock detecting means delivering a knock signal corresponding to the detected knocking state when the knocking state is detected thereby; and correction data calculating means for calculating a value of first correction data tending to change to a high degree, thereby preventing said knocking state, and a value of second correction data tending to change to a low degree, thereby preventing said knocking state, in response to said knock signal delivered from said knock detecting means;

the value of said first correction data being calculated so as to change in a first direction when said knock signal is delivered, and to change in a second direction opposite to said first direction when said knock signal is not delivered;

the value of said second correction data being calculated so as to change in a third direction when the value of said first correction data changes in said first direction to get beyond a preset value or range, and to change in a fourth direction opposite to said third direction when the value of said first correction data changes in said second direction to get beyond said preset value or range, the change of said second correction data in said third and fourth directions being different in degree;

said ignition timing control means including means for setting the ignition timing in accordance with said first and second correction data calculated by said correction data calculating means, and for controlling the operation of said ignition device on the basis of said set ignition timing; and said air-fuel ratio control means including means for setting the air-fuel ratio in accordance with at least one of said first and second correction data calculated by said correction data calculating means, for controlling the operation of said air-fuel ratio adjusting device on the basis of said set air-fuel ratio.

19. The control apparatus according to claim 18, wherein said second correction data is calculated to take a value such that the degree of the change of said second correction data in said third direction is higher than that in said fourth direction.

20. The control apparatus according to claim 18, wherein said correction data calculating means includes nonvolatile memory means for retentively storing said second correction data even after the operation of the engine is stopped, whereby said second correction data stored in said memory means is used when the engine is operated thereafter.

21. The control apparatus according to claim 18, wherein said correction data calculating means includes switch means capable of being selectively shifted, by manual operation, between a first shift position to provide initial correction data adapted for a high-octane fuel and a second shift position to provide initial correction data adapted for a low-octane fuel, whereby the initial value of said second correction data is given depending on the shift position of said switch means.

* * * * *